2,901,009

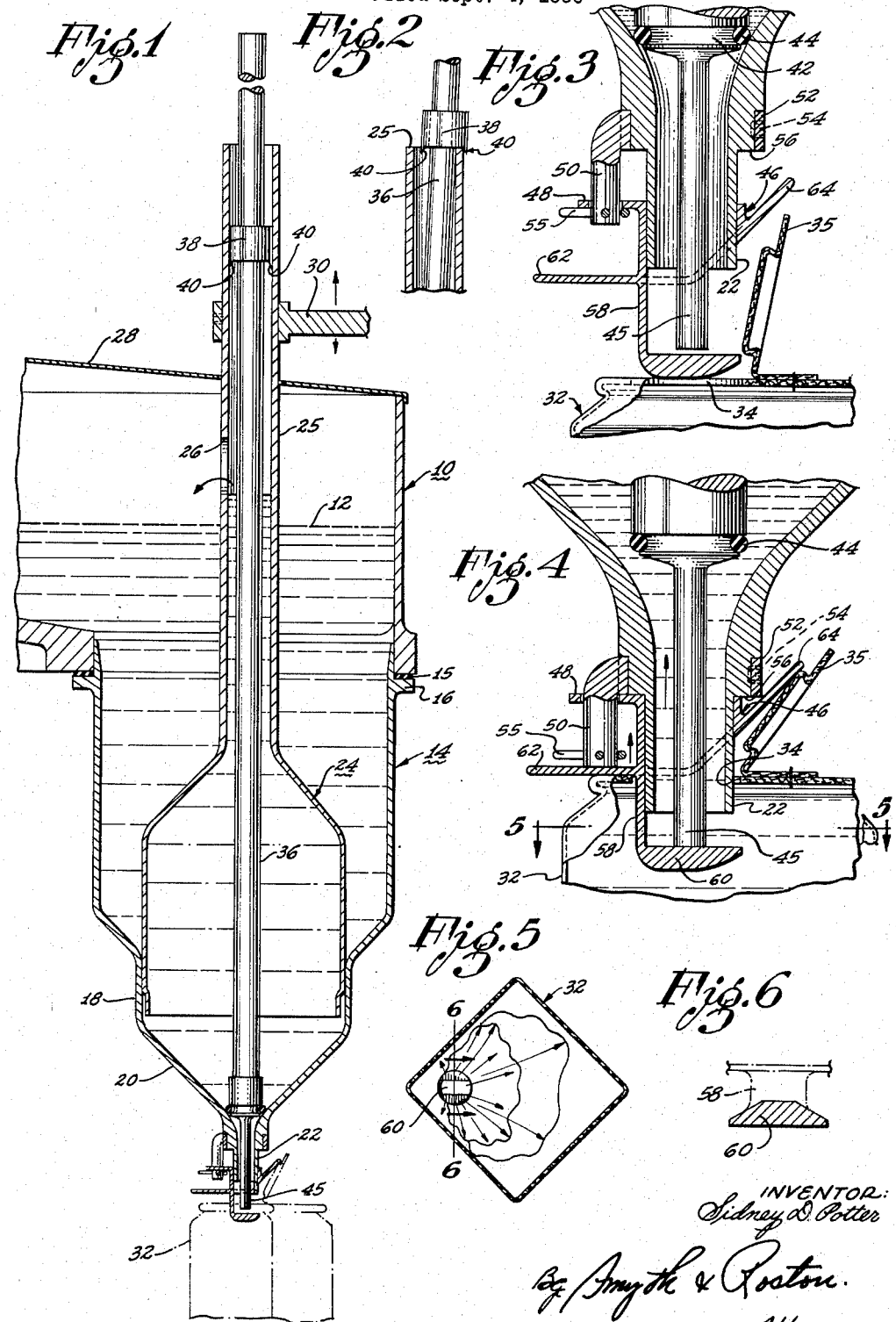

APPARATUS FOR FILLING MILK BOTTLES

Sidney D. Potter, Los Angeles, Calif.

Application September 4, 1956, Serial No. 607,930

3 Claims. (Cl. 141—286)

This invention relates to an appatraus for filling containers, with special reference to milk containers, and is specifically directed to a dispensing valve and associated valve operating mechanism for such an apparatus.

The type of apparatus to which the invention refers includes a large receptacle having a series of filling stations at each of which a tapered bottom portion of the receptacle terminates in a downwardly extending dispensing nozzle. A measuring hood inside the receptacle at each filling station is periodically lifted for admission of milk and lowered to telescope into the tapered bottom portion of the receptacle to trap a predetermined quantity of milk. A valve member at each filling station which normally closes the corresponding dispensing nozzle extends upward through the measuring hood and is periodically raised by suitable mechanisms connected to its upper end to release the measured quantity of milk through the dispensing nozzle.

While a conventional apparatus of the character described serves its purpose, nevertheless, it has certain troublesome disadvantages. One disadvantage resides in the valve-operating mechanism which includes a gooseneck at the upper end of each hood, a valve-lifting block and a rail which is inclined upward for valve operation at each station. It has been found that such a valve operating mechanism requires frequent attention with consequent interruption of production. Moreover, such a valve operating mechanism clutters the apparatus. Another disadvantage is that the described arrangement interferes with the necessary periodical cleaning operations wherein steam is used for sterilization of the apparatus.

The present invention avoids these disadvantages by eliminating the valve operating mechanism at the top of the apparatus and by eliminating the usual upper goosenecks. In the new arrangement, the dispensing valve is operated by impingement of an empty container against an operating member as the container moves along an upward path to a filling station. For this purpose, a portion of the seated valve extends through and below the dispensing nozzle and a lift member adapted for operation by a container is positioned under the downwardly extending portion of the valve to lift and open the valve. The portion of the lift member that contacts the lower end of the valve has a dual purpose since it not only lifts the valve to open position but also serves as a baffle to spread the milk stream to the side walls of the container to minimize the tendency of the milk to foam.

Accessibility of the inner surfaces of the apparatus for cleaning and sterilization is achieved by forming the measuring hood with an upper tubular end extending into the atmosphere and by providing the valve with an upper end that extends through the tubular extension of the hood. A feature of the preferred practice of the invention is the provision of a collar on the upper portion of the valve member, which collar has multiple functions as will be explained.

The various features and advantages of the invention will be apparent from the following detailed description considered with the accompanying drawing.

In the drawing, which is to be regarded as merely illustrative:

Figure 1 is a vertical section of the apparatus at one of the filling stations showing a container approaching the valve lifting member;

Figure 2 is a fragmentary sectional view of the upper end of the tubular portion of the measuring hood showing how the valve member may be engaged therewith;

Figure 3 is an enlarged portion of Figure 1 showing the valve lifting member and an approaching container;

Figure 4 is a view similar to Figure 3 showing how the valve member is unseated by the movement of a container to the filling station;

Figure 5 is a transverse section on a reduced scale taken as indicated by the line 5—5 of Figure 4 and showing how the stream of milk from the dispensing nozzle is diverted to spread out towards the side walls of the container; and Figure 6 is an enlarged section of the baffle means for spreading the milk stream, the section being taken along the line 6—6 of Figure 5.

The apparatus shown in the drawing includes a large supply tank or receptacle 10 to hold a liquid body 12 of milk and each of the filling stations comprises a corresponding bottom portion of the tank in the form of a detachable well 14. Each of the detachable wells 14 telescopes into the fixed structure of the tank 10 in a releasable manner and is sealed by a suitable gasket 15 in compression between the fixed structure and a circumferential rib 16 of the well. Each well 14 tapers to a cylindrical portion 18 and again tapers to form a conical bottom 20 that terminates in a downwardly extending dispensing nozzle 22.

What may be termed a measuring bell 24 having an upright tubular extension 25 is dimensioned to telescope into the cylindrical portion 18 of the well to cooperate therewith for isolating a predetermined quantity of milk, say 1 quart. The tubular extension 25, which has an accurately positioned overflow port 26, slidingly extends through a cover 28 of the milk tank and is open at its upper end to the atmosphere. A suitable mechanism, including an actuating arm 30 engaging the tubular extension 25, functions to periodically raise and lower the measuring bell.

With the dispensing nozzle 22 closed, the measuring bell 24 is lifted to permit milk to flow under and into the interior of the bell. The measuring bell is then moved downward to the telescoped position shown in Figure 1 to trap the predetermined amount of milk, the excess milk flowing out of the overflow port 26. The dispensing nozzle 22 is then opened to release the predetermined quantity of milk into a container. In this instance, the container is a wax paper carton 32 having a top opening 34 and the usual cover flap 35 to close the opening.

The structure described to this point is conventional. The present invention resides in the provision of a valve member in the form of a rod 36 for controlling flow through the dispensing nozzle 22 and the further provision of means in the region of the dispensing nozzle for controlling this valve rod.

The valve rod 36 is longer than the measuring bell 24 including the tubular extension 25 and extends into the atmosphere so that the upper end of the valve rod is accessible for manual manipulation when desired. In the construction shown, the valve rod 36 has an enlargement or integral collar 38 near its upper end that fits slidingly into the tubular extension 25 to permit the measuring bell to reciprocate without interference by the valve rod. One purpose of the collar 38 is to cooperate with the tubular extension 25 of the measuring bell for guiding the upper end of the valve rod. Another purpose is to close the upper end of the measuring bell. A third function of the collar 38 is to serve as means for suspending the valve rod 36 on the upper end of the tubular extension 25 of the measuring bell. For this purpose, the collar 38 may be formed with one or more downwardly extending lips 40 any one of which may be used for hook engagement with the upper end of the tubular extension 25 in the manner shown in Figure 2. The valve rod 36 is suspended in this manner during the periodic operation of cleaning and sterilizing the tank 10.

The valve rod 36 is normally at its lower limit position shown in Figure 1 for cutting off the dispensing nozzle 22. In the construction shown, the valve rod has a circumferential groove 42 (Figure 3) to retain an O-ring 44 that normally seats on the inner tapered surface of the conical portion 20 of the well 14 to cut off the dispensing nozzle 22. Below the O-ring 44, the valve rod 36 is reduced in diameter to form what may be termed an operating pin 45 that extends through the dispensing nozzle 22 and is substantially smaller than the inside diameter of the dispensing nozzle to permit the flow of milk therethrough. At the closed position of the valve rod 36, the valve rod extension or operating pin 45 extends a suitable distance below the lower end of the dispensing nozzle.

In accord with the teaching of the invention, any suitable operating means may be mounted in the region of the dispensing nozzle 22 for actuation by a container 32 for lifting the valve rod 36 to open position in response to the movement of a container to the filling station. In the present embodiment of the invention, the operating means comprises a collar 46 that slidingly embraces the nozzle 22 for movement between upper and lower positions thereon.

In the construction shown, the collar 46 has an ear 48 which is apertured for sliding engagement with a downwardly extending guide finger 50. The guide finger 50 may be integral with a ring 52 that is mounted at an upper position on the dispensing spout 22 and is secured by a suitable set screw 54. The lower limit position of the reciprocative collar 46 is determined by a cotter pin 55 one leg of which extends through a cross bore in the guide finger 50. The cotter pin 55 is easily removed to permit the operating collar 46 to be removed from the dispensing nozzle during cleaning and sterilization operations. At its upper limit, the operating collar 46 abuts a shoulder 56 of the nozzle.

The reciprocative operating collar 46 has a downwardly extending angular finger 58, the end portion of which forms a baffle or diverter element 60. The diverter element 60 extends under the valve operating pin 45 and at the lower limit position of the operating collar 46 is spaced slightly below the operating pin to permit the valve rod 36 to seat effectively at its closed position. In addition to its primary function of lifting the valve rod 36 when the operating collar 46 is moved upward, the diverter element 60 also serves as means to cause the stream of milk from the dispensing nozzle 22 to fan out against the side walls of the container as indicated by the arrows in Figure 5 to minimize foaming action by the milk.

For cooperation with a container 32 to carry out the valve-opening operation, the operating collar 46 is provided with a flange having a horizontal portion 62 and an inclined portion 64. The horizontal portion 62 makes operating contact with the upper end of a container 32 and the inclined portion 64 holds the container cover flap 35 out of the way as shown in Figure 4.

The manner in which the invention serves its purpose may be readily understood from the foregoing description. Normally the valve rod 36 is seated at its closed position as shown in Figure 1 with the diverter element 60 of the angular finger 58 spaced slightly below the operating pin 45 as best shown in Figure 3. A predetermined quantity of milk is trapped in the well 14 at the filling station by the action of the actuating arm 30 in lifting the measuring bell and then restoring the measuring bell to its normal lower position shown in Figure 1.

A carton to be filled with milk is moved upward into filling position along a path that first places the diverter element 60 and the nozzle 22 inside the carton through the carton opening 34 and then causes the upper end of the carton to abut the horizontal flange 62 for upward displacement of the operating collar 46 against the shoulder 56. With the upward movement of the operating collar 46, upward movement of the diverter element 60 of the angular finger 58 against the lower end of the operating pin 45 lifts the valve rod 36 to open position. The lifting of the valve rod 36 permits the milk to flow through the dispensing nozzle against the diverter element 60 thereby to cause the stream of milk to fan out inside the carton. The filled carton is then lowered from the filling position with consequent lowering of the operating collar 46 and restoration of the valve rod 36 to its normal closed position.

In preparation for a cleaning and sterilization operation, the valve rod 36 is suspended from the top of the tubular extension 25 shown in Figure 2. The cotter pin 55 is withdrawn for removal of the reciprocative collar 46 and, if desired, the well portion 14 is removed from the milk tank.

My description in specific detail of the presently preferred embodiment of the invention will suggest various changes, substitutions and departures from my disclosure within the spirit and scope of the appended claims.

I claim:

1. In an apparatus for dispensing measured quantities of milk to containers for distribution to consumers, the combination of: a supply receptacle having a lower portion with a downwardly extending bottom nozzle; means inside said receptacle to isolate a predetermined quantity of the liquid in communication with said bottom nozzle; a valve member inside said lower portion and normally seated on the lower portion to cut off said nozzle, said valve member having an axial extension through said nozzle normally extending below the end of the nozzle when the valve member is in closed position; and an operating means movably mounted on the exterior of said nozzle and having an angular finger dimensioned to extend into the container under said extension of the valve member, said operating means being movable between a normal lower position and an upper position, said angular finger of the operating means being spaced below said extension of the valve member at the lower position of the operating means, said angular finger moving upward against said extension to lift the valve member to open position when said operating means moves from its lower position to its upper position, said operating means extending laterally from said nozzle for engagement with the top of a container to be lifted to its upper position by upward movement of the container thereby to lift said valve member to open position for filling the container, the area of said operating means that is positioned for contact with the container being less than the area of the opening of the container to permit the air in the container to be displaced into the atmosphere.

2. A combination as set forth in claim 1 in which said angular finger has a portion extending across the axis of said nozzle in the path of flow from the nozzle, said portion in the path of flow being of greater area than the cross-sectional area of said extension of the valve member to present a surface in the path of the dispensing stream to divert the dispensing stream to the said walls of the container.

3. A combination as set forth in claim 1 which includes releasable means to retain said operating means on said nozzle whereby the operating means may be removed from the nozzle for cleaning.

References Cited in the file of this patent
UNITED STATES PATENTS

| | | |
|---|---|---|
| 340,646 | Westgate | Apr. 27, 1886 |
| 1,031,187 | Larson | July 2, 1912 |
| 1,445,339 | Mathews | Feb. 13, 1923 |
| 1,837,412 | De Back | Dec. 22, 1931 |
| 2,144,628 | Hothersall | Jan. 24, 1939 |
| 2,168,380 | Winton | Aug. 8, 1939 |
| 2,312,180 | Manly | Feb. 23, 1943 |
| 2,755,980 | Jacobs | July 24, 1956 |
| 2,801,032 | Hall | July 30, 1957 |